United States Patent Office 3,539,570
Patented Nov. 10, 1970

3,539,570
2-CYCLOALKYL-SUBSTITUTED-TETRAHYDRO-HALO-SULFAMYL-QUINAZOLINONES
Bola Vithal Shetty, Rochester, N.Y., assignor to Pennwalt Corporation, a corporation of Pennsylvania
No Drawing. Continuation-in-part of application Ser. No. 517,995, Jan. 3, 1966. This application Nov. 2, 1967, Ser. No. 680,029
Int. Cl. C07d 51/48
U.S. Cl. 260—256.5
9 Claims

ABSTRACT OF THE DISCLOSURE

A 1,2,3,4-tetrahydro-halo-sulfamyl-4-quinazolinone having diuretic properties, characterized by having in the 3-position a substituted or unsubstituted aryl or aralkyl group and by having in the 2-position a substituted or unsubstituted cycloalkyl or cycloalkylalkyl group.

---

This application is a continuation-in-part of applicant's co-pending application Ser. No. 517,995, filed Jan. 3, 1966 now Pat. 3,360,518 patented Dec. 26, 1967.

The invention relates to 1,2,3,4-tetrahydro-7-halo or haloalkyl-6-sulfamyl-3-aryl or aralkyl-4-quinazolinone compounds having diuretic characteristics. Mor particularly the invention relates to such compounds having cycloalkyl, cycloalkylalkyl, or halogen substituted cycloalkyl or cycloalkylalkyl groups in the 2-position.

In accordance with this invention 1,2,3,4-tetrahydro-7-halo- or haloalkyl-6-sulfamyl-3-aryl or aralkyl-4-quinazolinone compounds have cycloalkyl, cycloalkylalkyl, or halogen substituted cycloalkyl or cycloalkylalkyl groups in the 2-position. These compounds, like the compounds having hydrogen or straight chain alkyl groups in the 2-position are effective diuretics.

The compounds of this invention are preferably of the following formula:

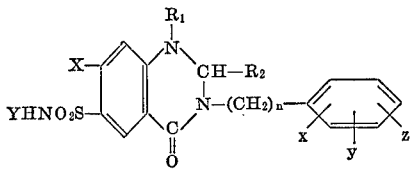

or the pharmaceutical acceptable salts thereof, in which X is halogen or trifluoromethyl, Y is hydrogen or loweralkyl, $R_1$ is hydrogen or loweralkyl, $R_2$ is lowercycloalkyl, lowercycloalkylloweralkyl, lowercycloalkylthioloweralkyl, lowercycloalkyllowerakylowerthioalkyl, halogen substituted cycloloweralkyl, or halogen substituted cyclolower-alkylloweralkyl, $x$ is hydrogen, loweralkyl, hydroxy, alkoxy, $NH_2$, $SO_2NH_2$, halogen or trifluoromethyl, $y$ and $z$ are any of $x$, and $n$ is an integer from 0–4.

Loweralkyl means an alkyl group having not more than 8 carbon atoms in a straight chain, and lowercycloalkyl means that the cycloalkyl group contains not more than 8 carbon atoms.

In the above Formula X is preferably chlorine or trifluoromethyl, but bromine and the other halogens are not precluded. $R_1$ is preferably hydrogen, but lower alkyls such as methyl, ethyl, propyl, and isopropyl may be used. $R_2$ is preferably cyclobutyl or cyclobutylmethyl. The halogen of the halogen substituted cycloalkyl is chlorine or other halogen. The thio substitution is preferably in the alkyl group. $x$, $y$, and $z$ may be any of the stated radicals in one or more of the ortho, meta or para positions. Preferably $x$ is methyl in the ortho position, also where sulfamyl is used it is preferably present in the meta or para position with methyl in the ortho position.

Specific suitable compounds of the above formula include:

2-cyclobutyl-3-o-tolyl-6-sulfamly-7-chloro-1,2,3,4-tetrahydro-4-quinazolinone;
2-cyclobutylmethyl-3-o-tolyl-6-sulfamyl-7-trifluoromethyl-1,2,3,4-tetrahydro-4-quinazolinone;
2-cyclopentyl-3-o-tolyl-6-sulfamyl-7-trifluoromethyl-1,2,3,4-tetrahydro-4-quinazolinone;
2-cyclopentylmethyl-3-o-tolyl-6-sulfamyl-7-chloro-1,2,3,4-tetrahydro-4-quinazolinone;
2-cyclohexyl-3-o-tolyl-6-methylaminosulfonyl-7-chloro-1,2,3,4-tetrahydro-4-quinazolinone;
2-cyclohexylmethyl-3-(p-chlorophenyl)-6-sulfamyl-7-chloro-1,2,3,4-tetrahydro-4-quinazolinone;
2-cyclobutyl-3-o-tolyl-6-methylaminosulfonyl-7-chloro-1,2,3,4-tetrahydro-4-quinazolinone;
2-cyclobutylmethyl-3-phenyl-6-sulfamyl-7-chloro-1,2,3,4-tetrahydro-4-quinazolinone;
2-methylcyclopropyl (2'-methyl-3'-chlorophenyl)-6-sulfamyl-7-chloro-1,2,3,4-tetrahydro-4-quinazolinone;
2-methylcyclopropylmethyl-3-(p-chlorophenyl)-6-methylaminosulfonyl-7-chloro-1,2,3,4-tetrahydro-4-quinazolinone;
2-cyclopropylmethyl-3-(2'-methylbenzyl)-6-sulfamyl-7-chloro-1,2,3,4-tetrahydro-4-quinazolinone;
2-cyclohexyl-3-o-tolyl-6-sulfamyl-7-chloro-1,2,3,4-tetrahydro-4-quinazolinone;
2-cyclopropyl-3-o-tolyl-6-sulfamyl-7-chloro-1,2,3,4-tetrahydro-4-quinazolinone;
2-cyclobutyl-3-o-tolyl-6-sulfamyl-7-chloro-1,2,3,4-tetrahydro-4-quinazolinone;
2-cyclopropyl-3-o-tolyl-6-sulfamyl-7-trifluoromethyl-1,2,3,4-tetrahydro-4-quinazolinone;
2-cyclobutyl-3-o-tolyl-6-sulfamyl-7-trifluoromethyl-1,2,3,4-tetrahydro-4-quinazolinone;
2-cyclohexylthiomethyl-3-o-tolyl-6-sulfamyl-7-chloro-1,2,3,4-tetrahydro-4-quinazolinone;
2-(2,2,2-trifluoroethylthiocyclobutyl)-3-o-tolyl-6-sulfamyl-7-chloro-1,2,3,4-tetrahydro-4-quinazolinone;
2-cyclopropyl-3-o-tolyl-6-sulfamyl-7-chloro-1,2,3,4-tetrahydro-4-quinazolinone;
2-(4-chlorocyclohexyl)-3-o-tolyl-6-sulfamyl-7-chloro-1,2,3,4-tetrahydro-4-quinazolinone;
2(2,4-dichlorocyclohexylmethyl)-3-o-tolyl-6-sulfamyl-7-chloro-1,2,3,4-tetrahydro-4-quinazolinone;
2-(2-methylcyclobutylmethyl)-3-o-tolyl-6-sulfamyl-7-chloro-1,2,3,4-tetrahydro-4-quinazolinone;
2-adamantyl-3-o-tolyl-6-sulfamyl-7-chloro-1,2,3,4-tetrahydro-4-quinazolinone;
2-cycloheptyl-(3'-sulfamyl-4'-chlorophenyl)-3-o-tolyl-6-sulfamyl-7-chloro-1,2,3,4-tetrahydro-4-quinazolinone;
2-cycloheptylmethyl-(3'-sulfamyl-4'-chlorobenzyl)-3-o-tolyl-6-sulfamyl-7-chloro-1,2,3,4-tetrahydro-4-quinazolinone;
2-cyclobutyl-3-(o-hydroxyphenyl)-6-sulfamyl-7-chloro-1,2,3,4-tetrahydro-4-quinazolinone;
2-cyclobutyl-3-(o-methoxphenyl)-6-sulfamyl-7-chloro-1,2,3,4-tetrahydro-4-quinazolinone;

2-cyclobutyl-3-(p-aminophenyl)-6-sulfamyl-7-chloro-
1,2,3,4-tetrahydro-4-quinazolinone;
2-cyclobutylmethyl-3-(2'-methyl-4'-aminophenyl)-6-
sulfamyl-7-chloro-1,2,3,4-tetrahydro-4-quinazolinone;
2-cyclobutyl-3-(2'-methyl-3'-sulfamylphenyl)-6-sulfamyl-
7-chloro-1,2,3,4-tetrahydro-4-quinazolinone;
2-cyclobutyl-3(2'-methyl-3'-sulfamylphenyl)-6-sulfamyl-
7-trifluoromethyl-1,2,3,4-tetrahydro-4-quinazolinone;
2-cyclobutylethyl-3-(2'-methyl-3'-chlorophenyl)-6-
sulfamyl-7-trifluoromethyl-1,2,3,4-tetrahydro-4-
quinazolinone;
2-cyclobutyl-3-(2'-methyl-3'-chlorophenyl)-6-
methylaminosulfonyl-7-chloro-1,2,3,4-tetrahydro-4-
quinazolinone;
2-cyclobutylmethyl-3-(2'-sulfamylphenyl)-6-sulfamyl-7-
chloro-1,2,3,4-tetrahydro-4-quinazolinone;
2-cyclopentylmethyl-3-o-tolyl-6-sulfamyl-7-chloro-1,2,3,4-
tetrahydro-4-quinazolinone;
2-cyclobutyl-3-o-tolyl-6-cyclobutyl-3-o-tolyl-6-sulfamyl-
7-trifluoromethyl-1,2,3,4-tetrahydro-4-quinazolinone;
2-cyclopropylmethyl-3-o-tolyl-6-sulfamyl-7-chloro-1,2,3,4-
tetrahydro-4-quinazolinone;
2-cyclopropyl-3-o-tolyl-6-sulfamyl-7-trifluoromethyl-
1,2,3,4-tetrahydro-4-quinazolinone;
2-cyclobutyl-3-benzyl-6-sulfamyl-7-chloro-1,2,3,4-
tetrahydro-4-quinazolinone;
2-cyclopentyl-3-o-tolyl-6-sulfamyl-7-chloro-1,2,3,4-
tetrahydro-4-quinazolinone;
1 methyl 2-cyclobutyl-3-o-tolyl-6-sulfamyl-7-chloro-
1,2,3,4-tetrahydro-4-quinazolinone;
1-benzyl-2-cyclobutyl-3-o-tolyl-6-sulfamyl-7-chloro-
1,2,3,4-tetrahydro-4-quinazolinone;
2-cyclobutyl-3-(2'-methyl-4'-chlorophenyl)-6-sulfamyl-
7-chloro-1,2,3,4-tetrahydro-4-quinazolinone;
2-cyclobutylmethyl-3-o-tolyl-6-sulfamyl-7-chloro-1,2,3,4-
tetrahydro-4-quinazolinone;
2-cyclobutyl-3-(2'-trifluoromethyl-4'-aminophenyl)-6-
sulfamyl-7-chloro-1,2,3,4-tetrahydro-4-quinazolinone;

the sodium salt of 2-cyclobutyl-3-o-tolyl-6-sulfamyl-7-chloro-1,2,3,4-tetrahydro-4-quinazolinone; and the potassium salt of 2-cyclobutyl-3-o-tolyl-6-sulfamyl-7-chloro-1,2,3,4-tetrahydro-4-quinazolinone.

EXAMPLE 1

Preparation of 2-cyclopentyl-3-(o-tolyl)-6-sulfamyl-7-
chloro-1,2,3,4-tetrahydro-4-quinazolinone
Synthetic Route:

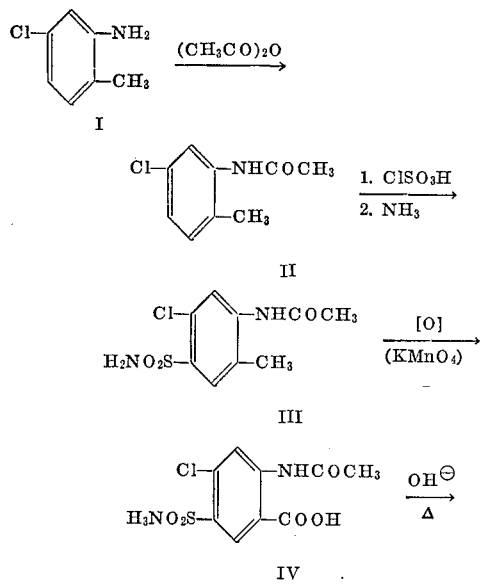

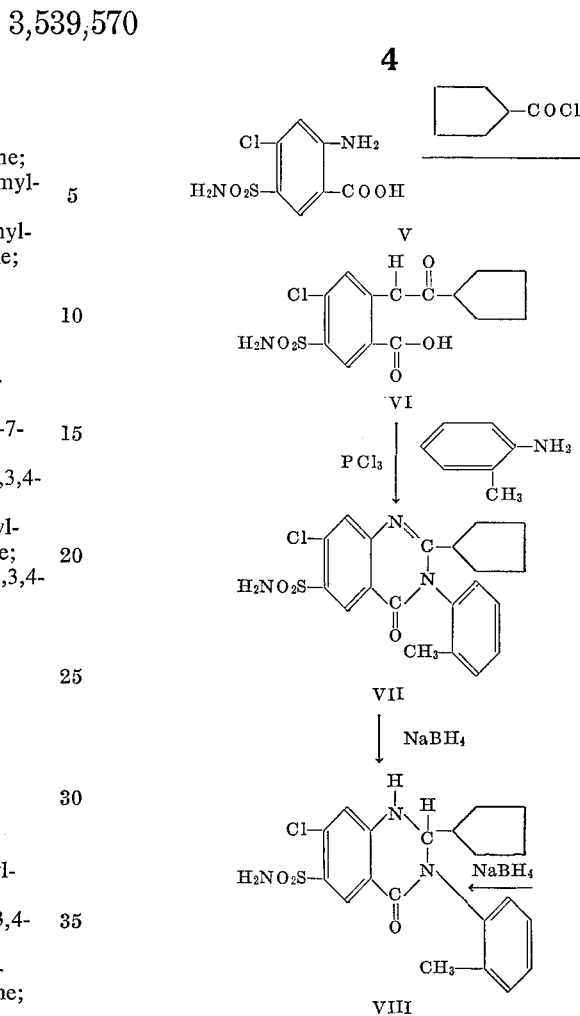

Preparation of 5-chloro-2-methylacetanilide, II 5-chloro-o-toluidine (I), (1000 gm.) was added to 9000 ml. of water, preheated to 35°, in a 4½ gallon battery jar. The slurry was vigorously stirred while 1260 gm. acetic anhydride was carefully added. Stirring was continued for four hours, then the product was filtered off and air dried. The crude product was recrystallized from 7500 ml. of benzene, using 40 gm. charcoal to remove some colored material. The product was air dried. It weighed 818 gm. and melted at 138–139°. This lot was combined with the material from lot numbers, 741–811, 741–859, 741–874, 745–612, 741–994, and 740–482. The total weight was 11 kg. from 10.4 kg. of starting material.

Preparation of 5-chloro-2-methyl-4-
sulfamylacetanilide, III

Chlorosulfonic acid (1000 gm.) was placed in a nitrogen flushed 5 liter, 3 neck round bottom flask fitted with a stirrer and a calcium chloride tube. 5-chloro-2-methylacetanilide (300 gm.) was cautiously added to the chlorosulfonic acid, and then 88 gm. sodium chloride was added portionwise over one hour. The reaction mixture was cautiously raised to 80° C. (foaming occurs). When the foaming had subsided, the temperature was raised to 92° C. and held there for three hours. The hot reaction mixture was added slowly with good agitation to 4000 ml. of acetone and 1500 gm. of ice. The resulting slurry was diluted with water to a total volume of 8000 ml. and the crude sulfonyl chloride was filtered off and washed with water. The damp filter cake was added to 3000 ml. of concentrated ammonium hydroxide, stirred at room temperature for one hour and then heated to 50° C. for two hours. The slurry was cooled, filtered, washed with water and air dried. The weight of product was 186 gm. It melted at 248–250°. This material was combined with that made in runs 741–863, 741–886, 747–505, 747–507, 747–903, and 745–647. The total weight of product was 4 kg. from 11 kg. starting material.

Preparation of N-acetyl-4-chloro-5-sulfamyl anthranilic acid, IV

Into a 12 liter flask was introduced 8000 ml. water, 1144 gm. magnesium sulfate heptahydrate and 400 gm. 5-chloro-2-methyl-4-sulfamylacetanilide. The mixture was heated to 80° and 710 gm. potassium permanganate was added portionwise with good stirring over about four hours at 80–85°. The mixture was kept at 80–85° for three hours after the permanganate addition was completed and then it was filtered hot. The manganese dioxide cake was washed with three 1000 ml. portions of water.

The filtrate was made acid with 200 ml. concentrated hydrochloric acid, filtered, washed with water and air dried. The crude product was combined with the crude product obtained from runs 743–858, 747–552, 742–237, 745–685, 747–529, and 740–245, giving a total weight of 2833 gm. This material was dissolved, (under Lot #745–687) in 100 liters of 95% ethanol. The resulting solution was concentrated to a total volume of 10 liters, periodically filtering off the product that had crystallized out and washing this with 95% ethanol. The yield of purified product was 2500 gm. melting at 264–266°, from 3 kg. of starting material.

Preparation of 4-chloro-5-sulfamylanthranilic acid, V

N-acetyl-4-chloro-5-sulfamylanthranilic acid (2500 gm.) was refluxed for three hours in 15,000 ml. 3 N sodium hydroxide solution, then brought to a pH of four with concentrated hydrochloric acid. After allowing it to cool to about 70°, the product was filtered off and washed with water. The wet product was dissolved in 200 liters of boiling water, filtered hot and allowed to cool. When filtered, washed with water and air dried, the product weighed 2000 gm. and melted at 275–276°.

Preparation of 2-cyclopentylcarbamido-4-chloro-5-sulfamylbenzoic acid, VI

To a suspension of 4-chloro-5-sulfamyl anthranilic acid (12.5 g., 0.05 m.) in 300 ml. ethyl acetate in a 1 l. 3 necked R.B. flask with stirrer and condenser was added cyclopentane carboxylic acid chloride. Reaction mixture was refluxed 5 hours and allowed to stand at room temperature overnight. Reaction mixture was filtered, solid (#1) collected and air dried. Fltrate concentrated to ⅓ volume on Rotovap at 40° C. Solid (#2) collected. M.P. 260–2° C. solid #1—M.P. 260–2° C. Combined 1 and 2. Wt. 12.8 g. M.P. 260–2° C.

Preparation of 2-cyclopentyl-3-(o-tolyl)-6-sulfamyl-7-chloro-4(3H)-quinazolinone, VII To a suspension of 2-cyclopentylcarbamido -4-chloro-5-sulfamyl benzoic acid (13.5 g., 0.040 m.) in 500 ml. tetrahydrofuran was added o-toluidine (8.0 g., 0.07 m.) then PCl₃ directly. Reaction mixture was refluxed 4 hours then alllowed to cool, solid was filtered off. Solid was recrystallized from 400 ml. hot absolute methanol. On cooling, 13.8 g. solid was collected (dried)—M.P. 241–3° C.

Preparation of 2-cyclopentyl-3-(o-tolyl)-6-sulfamyl-7-chloro-1,2,3,4-tetrahydro-4-quinazolinone, VIII To a suspension of 2-cyclopentyl-3-(o-tolyl)-6-sulfamyl-7-chloro-4(3H)-quinazolinone (13.8 g.) (0.033 m.) in 600 ml. 75% ethanol was added sodium borohydride (12.0 g., 0.3+ m.) over a 10 minute period, at room temperature. Reaction temperature raised and maintained at 80° C. for 1 hour. Hot reaction mixture poured into 1 l. of cold water. Solid filtered off and dried. Wt. 9.8 g. (crude). Solid recrystallized 3 times from a minimum amount of 90% ethanol wt. 4.3 g. M.P. 262–4° C.

Calc'd $C_{20}H_{22}Cl\ N_3O_3S$ (percent): C, 57.20; H, 5.28; N, 10.01; S, 8.44. Found (percent): C, 57.06; H, 5.35; N, 10.06; S, 8.39.

From pharmacology tests run on 2-cyclobutyl-3-o-tolyl-6 - sulfamyl - 7-chloro-1,2,3,4-tetrahydro-4(3H)-quinazolinone (compound 756–615) and other indications and analogy, the compounds of this invention are effective diuretics, saluretics, and antihypertensives with low toxicity. For example, the following is a summary of the pharmacology on compound 756–615:

I SUMMARY

Compound 756–615; 2 - cyclobutyl - 3-(o-tolyl)-6-sulfamyl - 7 - chloro-1,2,3,4-tetrahydro-4-quinazolinone, was compared with hydrochlorothiazide for its diuretic, natriuretic, and kaliuretic properties by a rat assay.

Compound 756–615 does have diuretic and natriuretic properties, however, the potency for these properties is approximately ⅟₃₀ that for hydrochlorothiazide.

II EXPERIMENTAL PROCEDURES

The basic assay method was that of Lipschitz, Hadidian, and Kerpcsar (J. Pharm. and Exp. Therap. 77:97) with minor modifications. Briefly, the method is as follows: four overnight fasted, Sprague-Dawley, albino rats were placed in each of ten stainless steel, nitric acid-washed metabolism cages. Two cages of animals were used as controls and were subjected to all procedures except dosing with compounds. All rats received an initial i.p. hydration of 2.5 cc. de-ionized water per 100 grams of animal weight. This was followed 2 hours later by 2.5 cc. of 0.9% saline per 100 g. of animal weight given by stomach tube. With this saline load, the compounds dissolved as .2% solutions in 0.2 N NaOH were also administered. The amount of NaOH per 100 g. of rat was kept constant. Control animals received all substances except the compounds.

Urine was collected under light mineral oil for 4 hours and analyzed for volume, [Na⁺], [K⁺], and [Cl⁻].

Appropriate calculations were done to convert the output of urinary volume, Na⁺, K⁺, and Cl⁻ into mcl. or mecq./kg./4 hrs.

Compound 756–615, a white powderly substance, was received from the Pharmaceutical Chemistry Department in an amber bottle and stored in a refrigerator. Hydrochlorothiazide (HCTZ), was obtained from Merck, Sharp and Dohme Research Laboratory and refrigerated.

The doses in mg./kg. administered were as follows:

| HCTZ | 0.10 | 0.32 | 1.00 | 3.20 |
|---|---|---|---|---|
| 756–615 | 0.10 | 1.00 | 10.00 | 100.00 |

III EXPERIMENTAL RESULTS

The various urinary outputs, calculated as described above, were plotted against the log of the doses. These dose-response curves are presented in FIGS. 1, 2, 3 and 4 for volume, Na⁺, K⁺, and Cl⁻ respectively.

For approximate potency comparisons, the distance between the steep portions of the dose-response curves were measured. The slopes of the dose-response curves are different for the two compounds, however. Assigning a value of 1 for the responses to HCTZ, the potencies of 756–615 compared with HCTZ for the various parameters of renal function are as follows:

Volume _____ 0.030
Na⁺ _____ 0.045
K⁺ _____ 0.100
Cl⁻ _____ 0.030

From this data compound 756–615 appears to be a less potent diuretic and natriuretic agent than hydrochlorothiazide.

No overt evidence of toxicity was seen in the test animals.

In the preceding specification the temperatures, wherever given, are in degrees centigrade.

Various modifications of the structural formula on page 1 of the specification may be made, such as, for example, has been done for other tetrahydro-7-halo-6-sulfamyl-4-quinazolinones known to the art, without departing from the spirit of the invention which is concerned particularly with the aryl and alkaryl group on the 3 position and alicyclic groups in the 2 position.

Likewise, therapeutically effective salts of the compounds of the invention may be made by methods known to the art, and are useful diuretics. For example, the sulfamyl group will react with bases to give sodium, potassium or ammonium salts of the quinazolinone compound. The basic nitrogen of the quinazolinone can be reacted with acids such as hydrochloric, maleic, tartaric, and the acidic ion exchange resins such as carboxylic acid, phosphonic acid, and sulfonic acid cation exchange resins to give the therapeutically effective and nontoxic salts of the quinazolinone compound.

I claim:
1. A compound of the formula:

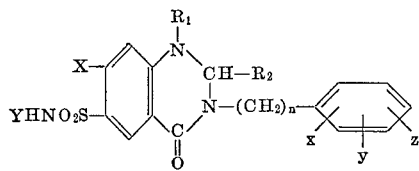

of the pharmaceutically effective salts thereof, in which X is halogen or trifluoromethyl, Y is hydrogen or loweralkyl, $R_1$ is hydrogen or loweralkyl, $R_2$ is lowercycloalkyl, lowercycloalkylloweralkyl in which the lowercycloalkyl is cyclopropyl or cyclobutyl, lowercycloalkylthioloweralkyl, lowercycloakylloweralkylthioloweralkyl, halogen substituted lowercycloalkyl, or halogen substituted lowercycloalkylloweralkyl in which the lowercycloalkyl is cyclopropyl or cyclobutyl, $x$ is hydrogen, loweralkyl, hydroxy, loweralkoxy, $NH_2$, sulfamyl, halogen, or trifluoromethyl, $y$ and $z$ are any of the members of $x$, and $n$ is an integer from 0–4.

2. The compound of claim 1 wherein X is chlorine, Y is hydrogen, $R_1$ is hydrogen, $R_2$ is a lowercycloalkyl, $x$ is orthomethyl, both $y$ and $z$ are hydrogen, and $n$ is 0.

3. The compound of claim 1 wherein X is chlorine, Y is hydrogen, $R_1$ is hydrogen, $R_2$ is a cyclopropyl, $x$ is orthomethyl, both $y$ and $z$ are hydrogen, and $n$ is 0.

4. The compound of claim 1 wherein X is chlorine, Y is hydrogen, $R_1$ is hydrogen, $R_2$ is cyclobutyl, $x$ is orthomethyl, both $y$ and $z$ are hydrogen, and $n$ is 0.

5. The compound of claim 1 wherein X is chlorine, Y is hydrogen, $R_1$ is hydrogen, $R_2$ is cyclopentyl, $x$ is orthomethyl, both $y$ and $z$ are hydrogen, and $n$ is 0.

6. The compound of claim 1 wherein X is chlorine, Y is hydrogen, $R_1$ is hydrogen, $R_2$ is cyclohexyl, $x$ is orthomethyl, both $y$ and $z$ are hydrogen, and $n$ is 0.

7. The compound of claim 1 wherein X is chlorine, Y is hydrogen, $R_1$ is hydrogen, $R_2$ is cyclopropylmethyl, $x$ is orthomethyl, both $y$ and $z$ are hydrogen, and $n$ is 0.

8. The compound of claim 1 wherein X is chlorine, Y is hydrogen, $R_1$ is hydrogen, $R_2$ is cyclobutylmethyl, $x$ is orthomethyl, both $y$ and $z$ are hydrogen, and $n$ is 0.

9. The compound of claim 1 wherein X is chlorine Y is hydrogen, $R_1$ is hydrogen, $R_2$ is a lowercycloalkylloweralkyl, $x$ is orthotrifluoromethyl, both $y$ and $z$ are hydrogen, and $n$ is 0.

References Cited
FOREIGN PATENTS 907,847  10/1962  Great Britain.

OTHER REFERENCES

Chem. Abstracts, 63:13286de (1965).

ALEX MAZEL, Primary Examiner

R. J. GALLAGHER, Assistant Examiner

U.S. Cl. X.R.

260—470, 556, 562; 424—251